United States Patent [19]

Boyd et al.

[11] Patent Number: 4,908,088

[45] Date of Patent: Mar. 13, 1990

[54] EXTREME DAMAGE TOLERANT GRAPHITE COMPOSITES AND METHOD OF MAKING SAME

[75] Inventors: Jack D. Boyd, Westminster; William T. Mead, Irvine; Theodore F. Biermann, Mission Viejo, all of Calif.

[73] Assignee: BASF Aktiengesellschaft, Ludwigshafen, Fed. Rep. of Germany

[21] Appl. No.: 162,073

[22] Filed: Feb. 29, 1988

[51] Int. Cl.$^4$ .............................................. C09J 5/02
[52] U.S. Cl. ............................... 156/307.3; 156/182; 156/308.2; 156/331.2; 428/261; 428/408; 428/473.5
[58] Field of Search ................. 156/307.3, 308.2, 182, 156/331.2; 428/261, 468, 473.5

[56] References Cited

U.S. PATENT DOCUMENTS

| | | | |
|---|---|---|---|
| 3,472,730 | 10/1969 | Frigstad | 156/307.3 |
| 3,987,230 | 10/1976 | Gaku et al. | 156/307.4 |
| 4,274,901 | 6/1981 | Elber . | |
| 4,443,566 | 4/1984 | Ying | 428/408 |
| 4,604,319 | 8/1986 | Evans et al. . | |

*Primary Examiner*—John J. Gallagher
*Attorney, Agent, or Firm*—William G. Conger

[57] ABSTRACT

Multilayer prepregs containing an engineering thermoplastic film laminated to a cyanate-functional thermosetting resin-impregnated fiber reinforcement are capable of preparing structural composites with extreme damage tolerance.

14 Claims, No Drawings

EXTREME DAMAGE TOLERANT GRAPHITE COMPOSITES AND METHOD OF MAKING SAME

BACKGROUND OF THE INVENTION

1. Field of the Invention

The subject invention relates to multilayer prepregs suitable for preparing extreme damage tolerant fiber reinforced composites. More particularly, the subject invention relates to multilayer prepregs prepared by laminating thin films of particular engineering thermoplastics with a layer of reinforcing fibers impregnated with a thermosetting resin containing substantial quantities of one or more heat-curable cyanate-functional resins. These prepregs may be stacked and cured to form fiber reinforced composites which exhibit extreme damage tolerance.

2. Description of the Related Art

The use of fiber reinforced composites has grown rapidly, especially in the transportation and aerospace industries. It is well known that composites containing fiber reinforcement such as high strength organic fibers, glass fibers, and particularly carbon/graphite (C/G) fibers can replace most structural metals in many applications. Such replacement frequently results in simultaneously increasing structural strength while decreasing mass. Such applications are particularly well suited to aerospace applications where high strength to weight ratios are desirable.

Among the fibrous reinforcing materials most frequently used in these applications are the carbon/graphite fibers. Prepregs containing C/G fibers may be readily fabricated using conventional techniques. For example, woven and non-woven C/G mats or fabrics, or colminated, unidirectional fiber tows may be impregnated with a heat curable thermosetting resin. The impregnating resin may be supplied in the form of a solution in a suitable non-reactive solvent, neat resin in the melt, or preferably neat resin supplied as one or more thin films.

The melt impregnation of fiber reinforcement with such films is well described in U.S. Pat. No. 3,784,433, for example. In this method, the fiber reinforcement is fed between heated rollers with one or more films of thermosetting resin. The combination of heat and pressure forces the resin into the fibers. Subsequent travel through additional rollers, if necessary, serves to work the resin into the fibers, assuring good fiber to-resin contact, and therefore, prepreg uniformity. During this process, the temperature of the resin film and prepreg are carefully controlled. Generally, the resin partially cures, or "advances" during this process to the still fusible "B-stage." If the temperature is too high, or the time the prepreg is exposed to processing temperatures too long, the resin may advance too far and the prepreg will not be suitable for its intended use in preparing composites. Adjustment of process variables is routinely and successfully practiced by those skilled in the art.

The finished prepregs are generally stored at low temperatures until just before use. Composites are produced from the prepregs by stacking the desired number of prepreg plies together, and curing under heat and pressure. During cure, the B-staged resin at first melts and flows, and then cures to the infusible "C-stage." Following cooling, the resulting composite has a strong, integral structure.

Although the composites produced by the above process are generally far stronger per unit weight than the common structural metals such as steel, aluminum, titanium and magnesium, such composites suffer from several disadvantages. Because of the chemical makeup of the resins utilized in the composites, strength decreases rapidly as the temperature increases. Furthermore, the resins are susceptible to damage by organic solvents and are generally combustible. Although these shortcomings limit somewhat the application of C/G composites, a more serious limitation is the lack of resistance to impact damage.

While C/G composites are exceptionally strong, their "toughness" is limited. When subjected to moderate to severe impact, extensive local damage may occur, resulting in a severe loss of overall strength in the composite. The damage caused by sudden impact is measured qualitatively by assessing the size of the damage area through application of ultrasound scanning techniques; or quantitatively by measuring compression after impact (CAI) values. For example, a 1500 in-lb/in impact by a 10.0 to 12.0 lb test weight having a 0.5 in hemispherical impact surface will frequently produce a damage area exceeding 4 in$^2$. The loss in compression strength may at times be in excess of 50 percent and is typically between 25 and 40 percent.

The large impact damage area and the loss of compressive strength has forced designers to increase the thickness of the composites used in various structures. However, the increase in thickness decreases the weight advantage of composites as compared to other materials. Furthermore, thicker laminates, while stronger, are more prone to impact induced delamination, and thus fairly large increases in thickness produce only modest increases in CAI values.

Attempts to increase toughness in C/G composites has met with but limited success. In U.S. Pat. No. 3,755,059, for example, the addition of a combination of corrugated metal foil and glass fiber reinforcement to C/G composites is suggested as a means of improving impact strength. However, only modest increases are possible with this method. Furthermore, the presence of metal within the composite causes heat distortion problems due to the different coefficients of thermal expansion of the various materials.

In U.S. Pat. No. 3,784,433, the use of plastic and metal foils or films is advocated, together with the use of thermosetting epoxy matrix resins containing significant amounts of polysulfone thermoplastic. However, no examples of the use of such films or foils are given. In U.S. Pat. No. 4,274,901, the use of mylar films is disclosed, however, it was found necessary to perforate the mylar thermoplastic films due to their poor adhesion to the epoxy matrix resin. Furthermore, the decrease in impact damage was achieved by sacrificing the interlaminar shear strength, an unacceptable compromise in advanced structural materials.

SUMMARY OF THE INVENTION

It has now been surprisingly discovered that bilayer prepregs containing cyanate functional thermosetting matrix resins, when used in conjunction with engineering thermoplastic films of approximately 0.5 mil or less thickness, allow the preparation of composites which possess extreme damage tolerance as measured by CAI values, without sacrificing interlaminar shear strength.

DESCRIPTION OF THE PREFERRED EMBODIMENTS

The cyanate resins used in the bilayer prepregs of the subject invention contain cyanate functional monomers, oligomers, or prepolymers which correspond generally to the formula:

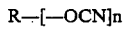

where n is an integer from 2 to about 5 and where R is an aromatic or substituted aromatic organic residue having a valence n. The cyanate functional monomers may be reacted and/or modified with a variety of other resins. for example maleimides, epoxies, acrylics, silicones, silicon-epoxies, alkyds, polyesters, isocyanates and polyisocyanates, polyurethanes, phenolics, melamines, and polyimides.

Examples of suitable cyanate functional monomers include dicyanatobenzene, tricyanatobenzene. dicyanatonaphthalene, tricyanatonaphthalene, 2,2'-, 2,4'-, and 4,4'-dicyanatobiphenyls, 2,2'-, 2,4'-, 3,3', and 4,4'-dicyanato-diphenylmethanes, 2,2-bis(4-cyanatophenyl)propane, 2,2-bis(3,5-dichloro-4-cyanatophenyl)propane, 2,2-bis(3,5-dibromo-4-cyanatophenyl)propane, bis(4-cyanatophenyl)ether, bis(4-cyanatophenyl)thioether, bis(4-cyanatophenyl)sulfone, tris(4-cyanatophenyl)phosphite, and cyanate functional oligomers and polymers obtained through the reaction of novolaks with cyanogen halides.

The cyanate functional monomers are prepared by known methods, generally by reacting a di- or polyhydric phenol with cyanogen chloride or cyanogen bromide. Especially preferred di- or polyhydric phenol cyanate precursors are the various bisphenols and their analogues, most particularly bisphenol A.

The cyanate functional monomers may also be converted to cyanate functional prepolymers prior to use in the cyanate resin systems of the subject invention. Polymerization of the monomers to prepolymers may be effectuated with catalysts such as Lewis acids, mineral acids, or salts such as sodium carbonate or lithium chloride. Preferably, the cyanate functional prepolymers have molecular weights of from about 400 to about 6000 Daltons. The cyanate functional prepolymers may be advantageously used in conjunction with the cyanate functional monomers.

Preferably used as comonomers in the cyanate functional resin systems of the subject invention are the various maleimide resins, particularly the bis-maleimides. Such comonomers are conveniently prepared by known methods, for example by reacting maleic anhydride with a suitable amine. Suitable maleimides are the maleimides of 2,2'-,2,4'-, 3,3'-, and 4,4'-diaminodiphenylmethanes, 1,4-phenylenediamine, xylylenediamine. 1,4-cyclohexanediamine, hexahydro-2,4- and 2,6-toluenediamines, bis(4-aminocyclohexyl)methane and 2,2'-, 2,4'-, and 4,4'-diaminodicyclohexanes. Also well suited as the maleimide comonomer are the polyaminobis-maleimides prepared by reacting one of the aforementioned bis-maleimides with a diamine. Suitable diamines include the same diamines utilized to prepare the bis-maleimides as well as the moderate and long chain aliphatic diamines, for example 1,4-butanediamine, 1,6-hexanediamine, 1,8-octanediamine, 1,10-decanediamine, and 1,12-dodecanediamine.

Epoxy resins may also be utilized as comonomers in the cyanate functional resin systems of the subject invention. These resins are characterized by the presence of at least one, but preferably two or more oxirane groups in the resin molecule and are well known resins of commerce. Examples of resin mixtures containing cyanate functional monomers and other comonomers such as the maleimides and epoxies are given in U.S. Pat. Nos. 4,110,364; 4,287,014; 4,544,704; and 4,533,727; which are herein incorporated by reference.

Cyanate-functional resins suitable for the practice of the subject invention contain, for example, from 30 to 90 percent by weight of a cyanate-functional monomer or oligomer, up to about 20 percent by weight of an epoxy resin, and up to about 20 percent by weight of a bismaleimide resin. The formulation may also include fillers, plasticizers, rheological control agents and the like. Catalysts are generally necessary to promote the cure of such compositions. Such catalysts are well known to those skilled in the art and may be, for example, various compounds and salts of heavy metals, particularly zinc, tin, and lead, most particularly the carboxylic acid salts of these metals.

A typical heat-curable, cyanate-functional resin formulation may contain 72 parts of 2,2-bis[4-cyanatophenyl]propane, 8 parts of bis[4-(N-maleimido)-phenyl]methane, 20 parts DEN ®-431, a novolac derived epoxy resin available from the Dow Chemical Company, Midland, Mich., and 0.05 parts of tin (II) octoate catalyst.

Thermoplastic films which may be used successfully in the prepregs of the subject invention are the engineering thermoplastics, for example those of the polyimide family. By the term engineering thermoplastic is meant those thermoplastics having high strength and toughness, particularly at elevated temperatures. In particular, these thermoplastics should have glass transition temperatures in excess of 100° C., preferably in excess of 150° C., and most particularly, above 200° C. In the specification and in the claims, the term "engineering thermoplastic" should be read as being consistent with the definition presented in this paragraph.

The term "polyimide family" is defined to include not merely the "true" polyimides, but modified polyimides such as the polyamidimides and polyetherimide thermoplastics. Examples of such films which are available commercially are the KAPTON ® polypyromelitimide polyimide films available from E.I. DuPont Corporation, Wilmington, Del., the ULTEM ® polyetherimide films available from the General Electric Company, Schenectady, N.Y. and those produced by the Dow Chemical Company as DOW ® 2080 polyimide. The thickness of these thermoplastic films should be nominally 0.5 mil or less. Preferably, films within the range of 0.05 mil to 0.7 mil are used, most preferably from about 0.1 to 0.5 mil.

Other engineering thermoplastics which are suitable include engineering thermoplastic films such as polyamide, polyethersulfone, polysulfone, polyarylates, polycarbonates, polyetherketones, polyetherketoneketones, and polyetherketone sulfones. Examples of such arylene ketones and sulfones may be found in U.S. Pat. No. 4,175,175. While these thermoplastic films provide acceptable results, care must be taken to avoid such films as the polyethylene terephthalates and other polyester films, as these films may not adhere sucessfully to the matrix resin, causing extensive delamination upon impact.

A further useful modification is the incorporation of minor amounts, i.e. up to about 35 percent by weight of a thermosetting resin into the thermoplastic film. Preferably, the thermosetting resin is one which is the same as, or is reactive and therefore compatible with, the matrix resin of the fiber reinforced layer. Among the thermosetting resins which may be useful are the bis- and polymaleimides, polyaminobismaleimides, cyanates, isocyanates, and epoxy resins.

The thermoplastic films are applied to the fiber reinforcement either before or after the latter is impregnated with the cyanate functional matrix resin. Preferably, the fiber reinforcement is first impregnated with the matrix resin following which the resulting prepreg is laminated to the thermoplastic film by the application of heat and pressure. Suitable adhesion of the engineering thermoplastic film to the fiber reinforced prepreg cannot be achieved merely through the use of actinic radiation. Heat and pressure are necessary to provide the degree of integrity required.

In the laminating process, the pressure and temperature must be adjusted such that sufficient adherence of the film to the prepreg is achieved without forcing the thermoplastic substantially into the prepreg and thus decreasing or eliminating the thermoplastic film thickness. However, it is necessary that some penetration be initiated, particularly with coarsely woven reinforcing fibers. Such adjustments are routinely made by those skilled in the art. The thermoplastic films may be added to one surface only as a single film, to one surface in the form of two sequentially or concurrently applied films, or to both surfaces of the prepreg in the same manner.

The following examples serve to illustrate the subject invention.

EXAMPLE 1

A unilayer C/G prepreg is prepared by the conventional film impregnation of CELION ® 12K C/G fiber, available from BASF Structural Materials, Charlotte, N.C., with a matrix resin substantially the same as that disclosed in European Published Application No. EP-A-230,631, which is herein incorporated by reference. Following matrix resin impregnation, the heat curable prepreg is laminated with a 0.5 mil film of ULTEM ® 1000 polyetherimide thermoplastic by passing the film and the prepreg between heated nips maintained at a temperature of approximately 120° C. and a pressure of approximately 40 lbs/in². Upon exiting the nip rollers the film is faced with a silicone coated release paper, taken up as a roll, and stored at below ambient temperature for future use.

EXAMPLE 2

A [45/0/-45/90]6S composite is prepared by stacking 47 plies of the bilayer prepreg of claim 1 and a bottom ply of otherwise identical monolayer C/G prepreg. A finished quasiisotropic panel is prepared by curing the above layup in an autoclave at 180° C. (350° F.) at 85 psi for two hours, with an oven post cure at 210° (410° F.) for four hours.

COMPARISON EXAMPLE A

In the same manner as in Example 2, composite specimens of the identical prepreg but without thermoplastic interleaf are prepared.

CAI Tests

The composites of Example 2 and Comparison Example A were impacted at three different energy levels in a fashion similar to NASA test B.11 "Compression After Impact Test" as reported at page 28 of NASA Reference Publication 1142 (1985), entitled "NASA-/Aircraft Industry Standard Specification for Graphite Fiber/Toughened Thermoset Resin Composite Material." Seven by twelve inch (17.8 by 30.5 cm) test plaques were subjected to impacts of 960, 1500, and 2000 in-lb/in. respectively. The damage area was measured by C-scan, and CAI values were measured in accordance with NASA test B.11. The results are presented in Table I.

TABLE I

| | Impact Levels In-lb/in | | | | | |
|---|---|---|---|---|---|---|
| | 960 | | 1500 | | 2000 | |
| Room Temperature Tests | Comparison Example A | Example 2 | Comparison Example A | Example 2 | Comparison Example A | Example 2 |
| Compression Failure Strength, Ksi | 33.0 | 63.8 | 31.0 | 48.5 | 32.0 | 48.0 |
| Failure Strain μin/in | 5,800 | 12,500 | 5,100 | 8,500 | 4,800 | 9,100 |
| Damage Area, in² | 2.4 | 0.2 | 3.7 | 2.04 | 5.9 | 2.35 |

TABLE I shows that the thermoplastic interleafed composites of Example II have approximately twice the compression after impact strength after low to moderate (960 in-lb/in) impact and maintain approximately a 1.5:1 advantage at higher impact levels as compared to conventional composites. The thermoplastic interleafed composites all show a marked advantage in impact damage area. Preferably, a finished composite has a 180° F. hot/wet compression strength of about 150 ksi or greater.

The embodiments of the invention in which an exclusive property or privilege is claimed are defined as follows:

1. A process for the manufacture of a multi-layer heat-curable prepreg comprising:
    (a) preparing a thermosetting, cyanate-functional resin-impregnated, fiber reinforced unilayer prepreg;
    (b) laminating to said unilayer prepreg one or more films of an engineering thermoplastic by means of heat and pressure such that said thermoplastic becomes fused to said unilayer prepreg producing an integral multi-layer structure, wherein said thermoplastic film is a 0.5 mil to 0.7 mil film of an engineering thermoplastic.

2. The process of claim 1 wherein said cyanate functional resin comprises from 50 to about 90 parts by weight of one or more cyanate-functional monomers, and from about 50 to 5 parts by weight of an additional resin selected from the group consisting of bis-maleimides, polymaleimides, polyimides, epoxy resins and mixtures thereof.

3. The process of claim 1 wherein said fiber reinforcement is carbon/graphite fiber.

4. The process of claim 1 wherein said unilayer prepreg contains from 20 to 50 percent by weight cyanate functional resin.

5. A multi-layer heat-curable prepreg comprising:

(a) a layer of fiber reinforcement impregnated with a thermosetting resin containing a cyanate-functional resin, and (b) a 0.05 to 0.7 mil layer of an engineering thermoplastic film, wherein said thermoplastic layer and said fiber reinforcement layer are fused together under heat and pressure to form an integral heat-curable multilayer structure.

6. The prepreg of claim 5 wherein said thermoplastic film contains from 1.0 to about 35 percent by weight of a thermosetting matrix resin selected from the group consisting of the bismaleimides, polymaleimides, polyaminobismaleimides, epoxies, and cyanate functional resins, and mixtures thereof.

7. The prepreg of claim 5 wherein said cyanate-functional resin comprises from 50 to about 90 parts by weight of one or more cyanate-functional monomers, and from about 50 to 5 parts by weight of at least one additional resin selected from the group consisting of bis-maleimides, polymaleimides, polyimides, epoxy resins and mixtures thereof.

8. The prepreg of claim 5 wherein said thermoplastic film contains from 1.0 to about 35 percent by weight of a thermosetting matrix resin selected from the group consisting of the bismaleimides, polymaleimides, polyaminobismaleimides, epoxies, and cyanate functional resins, and mixtures thereof.

9. The prepreg of claim 5 wherein said thermoplastic has a thickness of approximately 0.5 mil and is selected from the group consisting of polyimides and polyetherimides.

10. The prepreg of claim 9 wherein said thermoplastic film contains from 1.0 to about 35 percent by weight of a thermosetting matrix resin selected from the group consisting of the bismaleimides, polymaleimides, polyaminobismaleimides, epoxies, and cyanate functional resins, and mixtures thereof.

11. The prepreg of claim 5 wherein said fiber reinforcement is carbon/graphite fiber.

12. The prepreg of claim 11 wherein said thermoplastic film contains from 1.0 to about 35 percent by weight of a thermosetting matrix resin selected from the group consisting of the bismaleimides, polymaleimides, polyaminobismaleimides, epoxies, and cyanate functional resins, and mixtures thereof.

13. The prepreg of claim 7 wherein said thermoplastic has a thickness of approximately 0.5 mil and is selected from the group consisting of polyimides and polyetherimides.

14. The prepreg of claim 13 wherein said thermoplastic film contains from 1.0 to about 35 percent by weight of a thermosetting matrix resin selected from the group consisting of the bismaleimides, polymaleimides, polyaminobismaleimides, epoxies, and cyanate functional resins, and mixtures thereof.

* * * * *

UNITED STATES PATENT AND TRADEMARK OFFICE
CERTIFICATE OF CORRECTION

PATENT NO. : 4,908,088
DATED : March 13, 1990
INVENTOR(S) : Jack Douglas Boyd Et. Al.

It is certified that error appears in the above-identified patent and that said Letters Patent is hereby corrected as shown below:

Column 7, line 24, should read as follows:
  8. The prepreg of claim 7 wherein said thermoplastic Signed and Sealed this Twenty-first Day of May, 1991

Attest:

HARRY F. MANBECK, JR.

Attesting Officer

Commissioner of Patents and Trademarks